(12) United States Patent
Boner et al.

(10) Patent No.: US 7,435,351 B2
(45) Date of Patent: Oct. 14, 2008

(54) FILTER APPARATUS BACKWASH REMOVAL DEVICE AND BACKWASH REMOVAL METHOD

(75) Inventors: Mark C. Boner, Roswell, GA (US); Paula K. Gurney, Atlanta, GA (US)

(73) Assignee: Wwetco, LLC, Atlanta, GA (US)

(*) Notice: Subject to any disclaimer, the term of this patent is extended or adjusted under 35 U.S.C. 154(b) by 0 days.

(21) Appl. No.: 11/036,763

(22) Filed: Jan. 14, 2005

(65) Prior Publication Data

US 2005/0161412 A1    Jul. 28, 2005

Related U.S. Application Data

(62) Division of application No. 10/767,877, filed on Jan. 29, 2004, now Pat. No. 7,223,347.

(60) Provisional application No. 60/443,429, filed on Jan. 29, 2003, provisional application No. 60/502,383, filed on Sep. 12, 2003.

(51) Int. Cl.
*B01D 24/46* (2006.01)
*B01D 24/12* (2006.01)
*B01D 24/22* (2006.01)

(52) U.S. Cl. .................. 210/794; 210/795; 210/807; 210/350

(58) Field of Classification Search .......... 210/794, 210/795, 807, 350
See application file for complete search history.

(56) References Cited

U.S. PATENT DOCUMENTS

| 3,180,825 | A |   | 4/1965 | Couvreur et al. |
| 4,076,625 | A | * | 2/1978 | Scholten et al. ............. 210/274 |
| 4,118,322 | A | * | 10/1978 | San Roman ................. 210/136 |
| 4,139,473 | A |   | 2/1979 | Alldredge |
| 4,776,962 | A |   | 10/1988 | Wakeman |
| 4,851,136 | A |   | 7/1989 | Fanqing et al. |
| 5,112,504 | A |   | 5/1992 | Johnson |
| 5,207,905 | A | * | 5/1993 | O'Brien et al. ............. 210/274 |
| 5,248,415 | A |   | 9/1993 | Masuda et al. |
| 5,470,470 | A |   | 11/1995 | Leyat |
| 6,517,712 | B2 |   | 2/2003 | Xia et al. |
| 6,517,724 | B1 |   | 2/2003 | Malone |
| 6,641,737 | B2 |   | 11/2003 | Xia et al. |
| 2003/0111431 | A1 |   | 6/2003 | Dew, Jr. |

FOREIGN PATENT DOCUMENTS

| DE | 101 01 313 A1 | 7/2001 |
| WO | WO 02/07849 A1 | 1/2002 |
| WO | WO 02/24306 A1 | 3/2002 |

OTHER PUBLICATIONS

CSO Treatment Facilities, Uptown Park Water Resources Facility in Columbus, Georgia, with comments and pictures provided by the Applicants, 1994.

* cited by examiner

*Primary Examiner*—Thomas M Lithgow
(74) *Attorney, Agent, or Firm*—Smith, Gambrell & Russell LLP

(57) ABSTRACT

A filter media backwash removal method and device for transporting backwash fluid and solids away from re-entering a housing containing circulating filter media.

20 Claims, 7 Drawing Sheets

Fig_7

Fig_8

Fig_9

Fig_10

Fig_11

Fig_12

*Fig_14A*

*Fig_14B*

FILTER APPARATUS BACKWASH REMOVAL DEVICE AND BACKWASH REMOVAL METHOD

CROSS-REFERENCE TO RELATED APPLICATIONS

This application is a divisional of U.S. patent application Ser. No. 10/767,877 filed Jan. 29, 2004, now U.S. Pat. No. 7,223,347 which claims the benefit of priority of U.S. Application No. 60/443,429 filed Jan. 29, 2003 and U.S. Application No. 60/502,383 filed Sep. 12, 2003, all of which are incorporated herein by reference.

BACKGROUND OF THE INVENTION

The present invention relates to a method for removing backwash from a filter apparatus.

SUMMARY OF THE INVENTION

In embodiments of the invention, a backwash removal method is provided for removing backwash fluid during circulating and scrubbing of compressible media in a filter apparatus by air-elevating backwash fluid to a "highest" localized level above a lower surface level to drive the backwash fluid in a backwash removal device adjacent and contiguous to the localize elevated portion of backwash. In some embodiments, the process of the invention includes using one or more troughs that receive and remove backwash fluid. In further embodiments of the invention, the backwash process of the invention operates in a filter apparatus with a movable housing.

DETAILED DESCRIPTION OF THE INVENTION

The present invention provides an apparatus and method for filtering fluids with compressible filter media contained in a flexible housing. In the described embodiments, fluid outside the housing compresses the housing and filter media; however, it will be appreciated that a variety of external forces may be applied to the outer housing and compressible media to achieve the objectives of the invention in other embodiments. It will also be appreciated that although the invention is described in embodiments for top to down filtering of fluid, the apparatuses and components described herein may be positioned such that the filtration may occur in other directions, and repositioning is within the scope of the invention.

The present invention thus provides improved filtration, and is particularly adapted for the filtration of stormwater, drinking water and wastewater. Those skilled in the art will further appreciate that in other embodiments the present invention is adapted for use with a variety of fluids and filtering applications.

Figure 1:
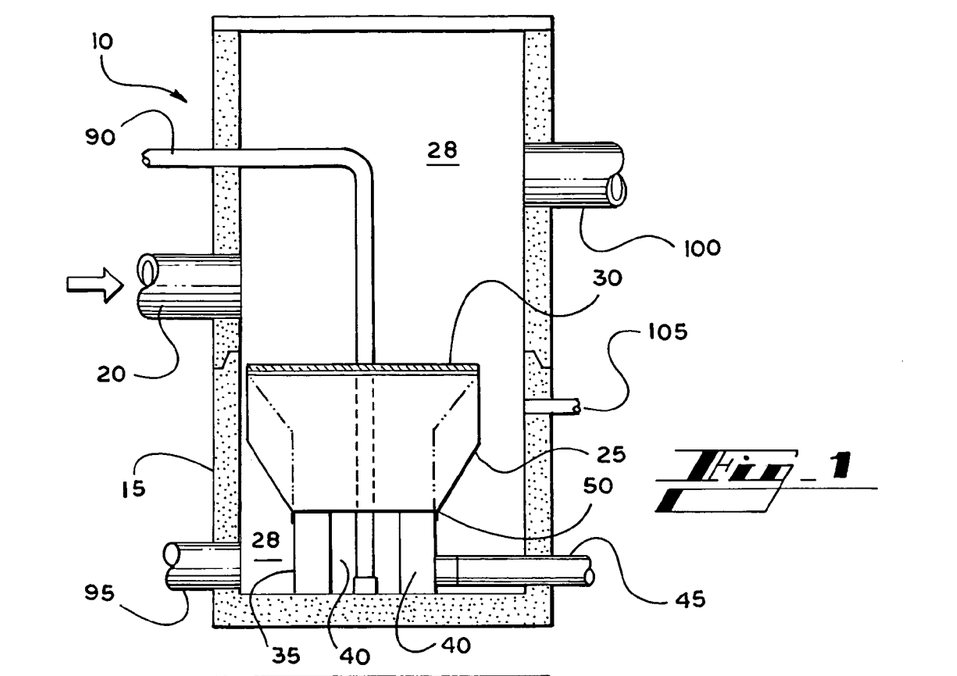
FIG. 1 is a schematic cross-sectional view of a single filter apparatus of the present invention showing a flexible housing for containing filter media in an embodiment of the present invention.

Referring to FIG. 1, in an embodiment of the present invention a filter apparatus 10 includes an outer fluid container 15. Outer fluid containment housings include concrete containers, earthen basins, natural water features (including a lake), and like environments in which fluid to be filtered may be contained. An influent pipe 20 provides fluid to be filtered into the outer container 15. It will be appreciated that the influent pipe 20 may be located in a variety of positions (such as above or below the top of the filter) and or/include a plurality of influent pipes 20.

Within the outer container 15 an upright filter media housing 25 is provided. FIG. 1 depicts the filter media housing 25 comprising a flexible membrane in both expanded and compressed embodiments to demonstrate compressibility of the housing. The top of the filter media housing 25 includes an upper perforated plate 30 to allow fluid to be filtered into the housing, as well as backwash fluid out of the housing, while retaining the filter media within housing (such as during backwash processes subsequently described).

A housing base 35 secures the filter media housing 25 at the bottom of the outer container 15.

Figure 5:
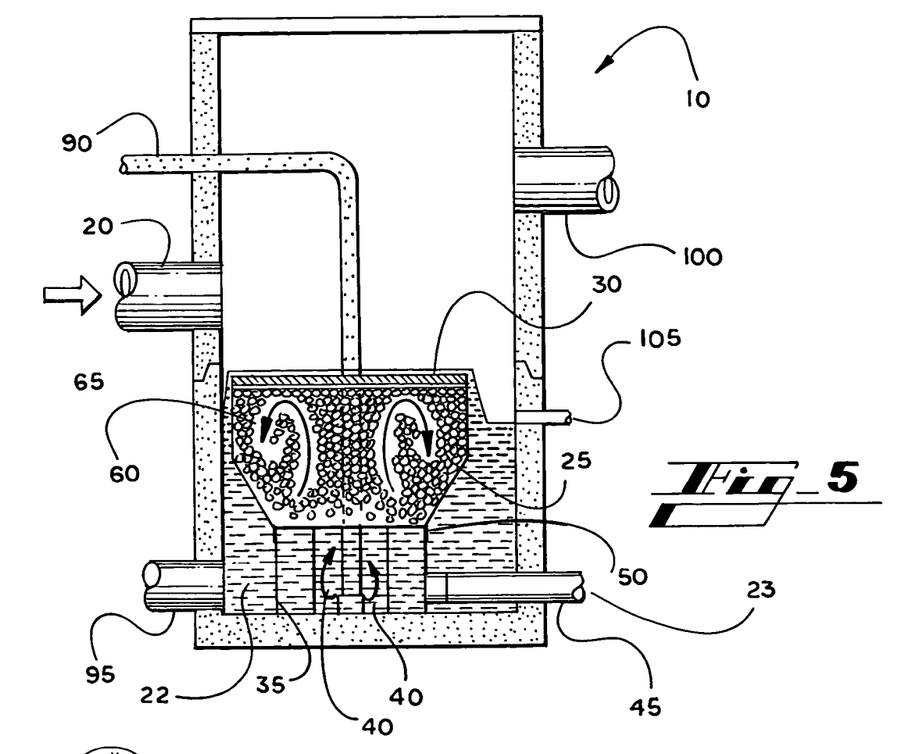
FIG. 5 is a schematic cross-sectional view of a filter apparatus of the present invention during backwash operation in an embodiment of the invention.

In one embodiment, the base may include baffles 40 that direct filtered fluid to an effluent pipe 45 carrying filtered fluid from the filter housing 25 out of the containment 15. The baffles 40 may also direct air and make-up water to the center of lower perforated plate 50 during backwashing operations (FIG. 5).

Figure 14A:
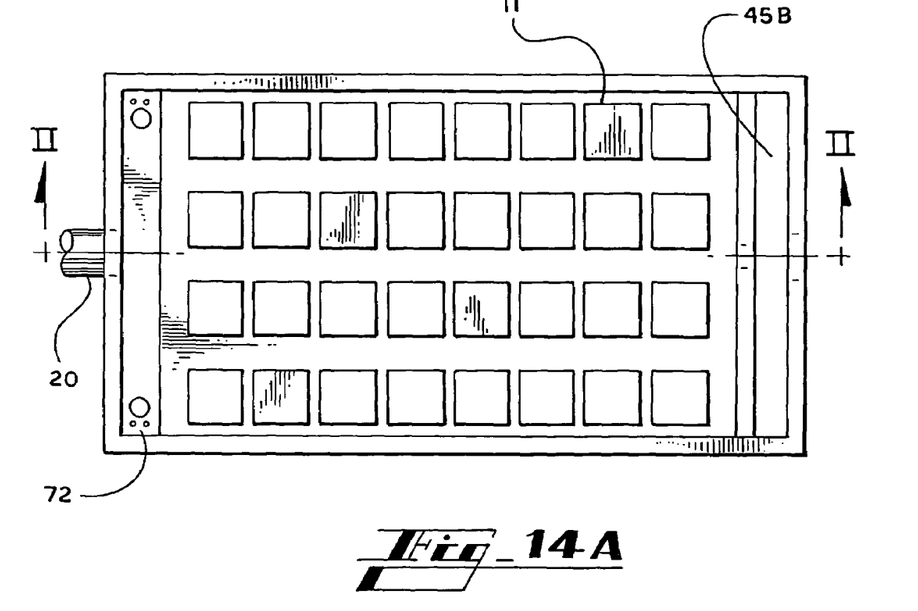
FIG. 14A is a schematic top plan view of a plurality of filter units within a large fluid containment in an embodiment of the invention.
Figure 14B:
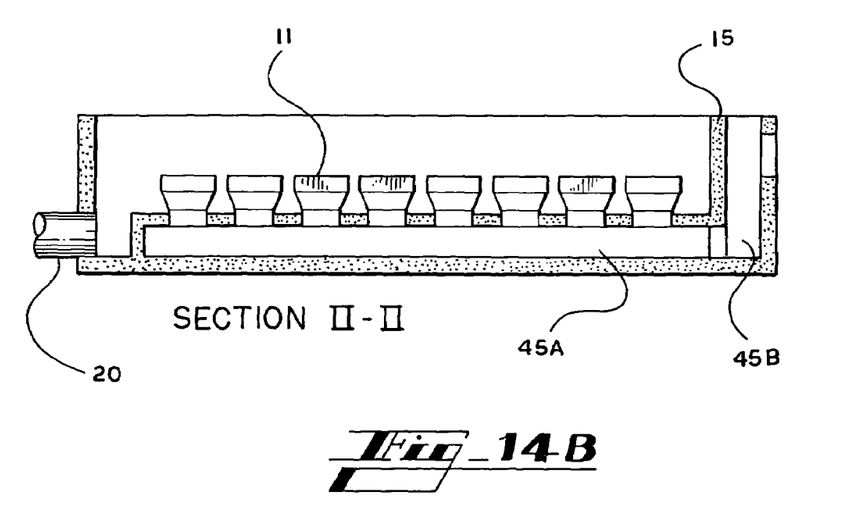
FIG. 14B is a schematic cross-sectional view of a plurality of filter units along line II-II of FIG. 14A.

Referring to FIGS. 14A and 14B, in other exemplary embodiments, the containment 15 may include a plurality of filter units 11 wherein the base may be a wall of an effluent channel/conveyance 45A or a piping network underlying one or more filter units 11. In such embodiments, the channel wall or piping serves as the base to support one or more filter units 11 is an upright position within the outer containment 15. The integrated filter unit 11 into the conveyance 45A may be provided without baffles 40.

In a large containment environment as shown in FIGS. 14A and 14B, the underlying effluent conveyances (or piping) 45A may all connect to a larger effluent conveyance 45B for carrying off filtered fluid. In other embodiments underlying conveyances 45A may be directed to other desired locations and conveyance points.

FIGS. 14A and 14B, also show that one or more backwash pumps 72 may be provided for removing backwash fluid from the containment 15 following the backwash process (subsequently described).

In embodiments utilizing a plurality of filter units 11, it will be appreciated that the containment 15 may include a large basin, natural feature, manmade containments and the like, where a large quantity of fluid is to be filtered. It will also be appreciated each of the filter units 11 includes compressible media 60 and a filter media housing 25 and operates as subsequently described with reference to a single filter unit.

Referring again to FIG. 1, between the upper plate 30 and base 35, the lower perforated plate 50 allows filtered fluid to exit the flexible housing 25. The lower perforated plate 50 also supports filter media 60 (FIG. 2) within the housing 25.

With further reference to FIG. 2 and FIGS. 7-11, compressible filter media 60 is housed within the housing 25 between the upper perforated plate 30 and lower perforated plate 50. Although the filter bundles disclosed in U.S. Pat. No. 5,248,415 to Masuda et al. and U.S. Patent Application Publication No. US2003/0111431 are particularly adapted for use as filter media 60 in the present invention, a variety of compressible fibrous filter elements may be used.

In certain embodiments, the fibrous media 60 of the present invention improves upon the prior art through the use of multi-component fibers where two or more synthetic materials are used in the same fiber to achieve the physical characteristics such as specific gravity, resilience, chemical resistance, stiffness, fiber diameter, and the like. In other embodiments, the filter media fiber may further include components with specifically desired performance characteristics such as specific pollutant removal capabilities. For example, oleophilic fiber components may be used in embodiments for attracting oil from fluid being filtered or hydrophobic fibers may be used to encourage water filtration. Those skilled in the art will appreciate that a wide variety of other combinations of components in the filter media may be adapted for use in the present invention depending on the desired performance the type of fluid and pollutants being filtered.

In one embodiment to achieve a chemically resistant fibrous lump of low resilience and lower specific gravity, the fiber is manufactured with a nylon inner core and polypropylene outer cover.

In another embodiment to obtain a heavier, more resilient lump 61 (FIGS. 7 and 8), the fiber is manufactured using a polyester inner core with a polypropylene sheath.

Figure 9:
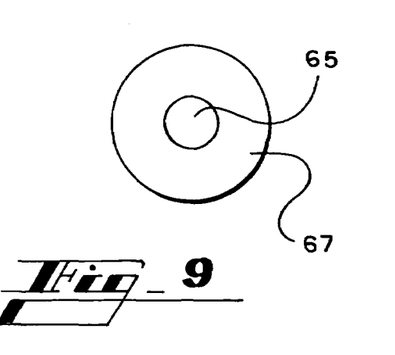
FIG. 9 is a schematic cross-sectional view of a concentric bi-component fiber in an embodiment of the invention.

Referring to FIG. 9, in one embodiment the multi-component fiber is a bi-component fiber, wherein an inner fiber 65 and an outer fiber 67 (sheath) are provided/extruded in a generally concentric configuration.

Figure 10:
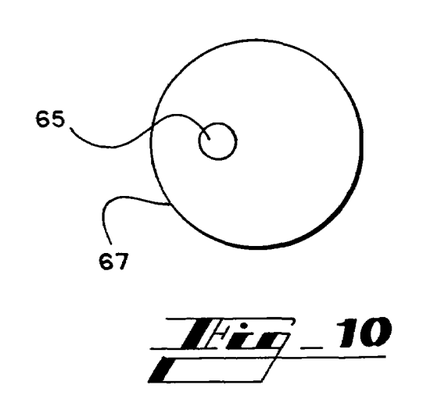
FIG. 10 is a schematic cross-sectional view of an eccentric bi-component fiber in an embodiment of the invention.

Referring to FIG. 10, in another embodiment the components are generally eccentric with the inner component 65 being off-center. In such embodiment, subsequently described, the eccentric configuration permits heating of the fiber to produce crimping based on the resultant heat distortion.

Figure 11:
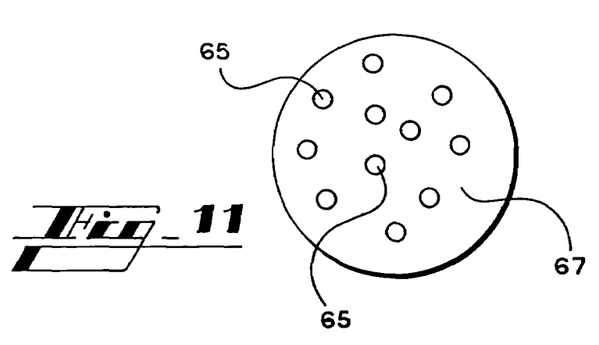
FIG. 11 is a schematic cross-sectional view a multi-component fiber in an embodiment of the invention.

It will be appreciated that in alternative embodiments a plurality of inner fibers 65 may be contained in a sheath 67, such as shown in FIG. 11. In such embodiments, the plurality of inner fibers 65 may be the same or different component materials. It will also be appreciated that one or more additional outer sheaths could be provided in alternative embodiments to achieve specific pollutant removal as well as exhibit desired physical characteristics.

In various embodiments, core and sheath materials may include any combination of the following, or other synthetic fibers: polyester (PET), coPET, polylactic acid (PLA), polytrimethylene terephthalate, polycyclohexanediol terephthalate (PCT), polyethylene napthalate (PEN); high density polyethylene (HDPE), linear low density polyethylene (LLDPE), polyethylene (PE), polypropylene (PP), PE/PP copolymer, nylon, polyvinylidene fluoride (PVDF), polytetrafluoroethylene (PTFE) and polyurethane.

Figure 6:
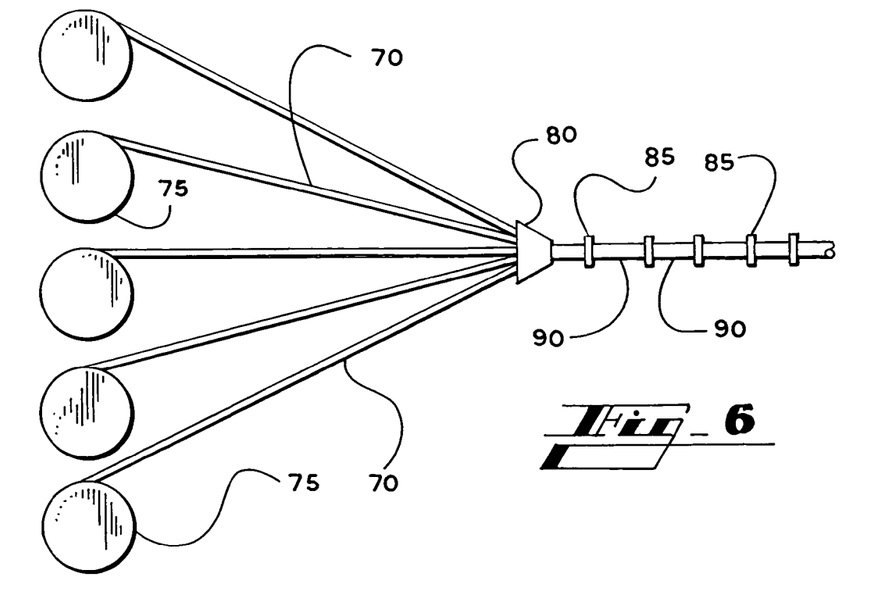
FIG. 6 is a schematic view of fiber being reduced from spools and bound for cutting into fiber media bundles in an embodiment of the invention.

Referring to FIG. 6, the fibers used as filter media 60 are initially in the form of loosely packed elongated fibers 70 on spools 75.

Figure 7:
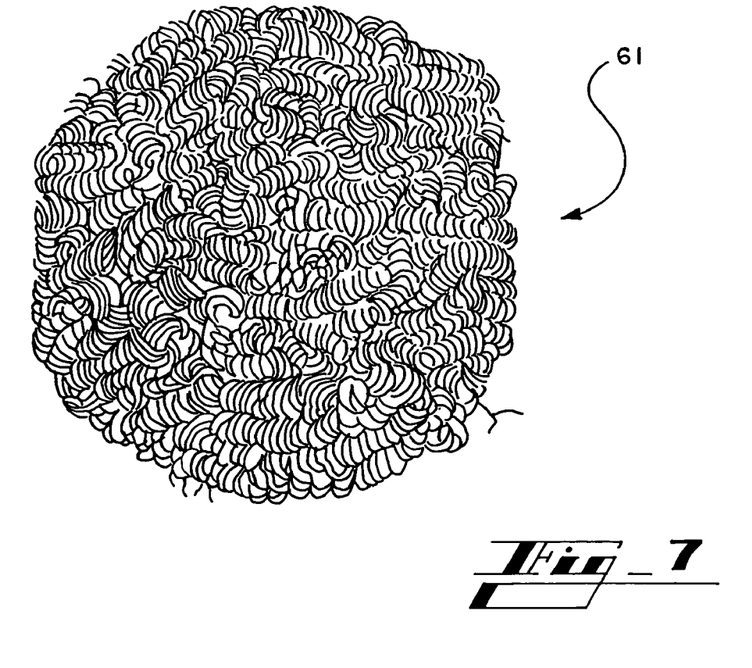
FIG. 7 is a front perspective view of a filter media bundle in an embodiment of the invention.
Figure 8:
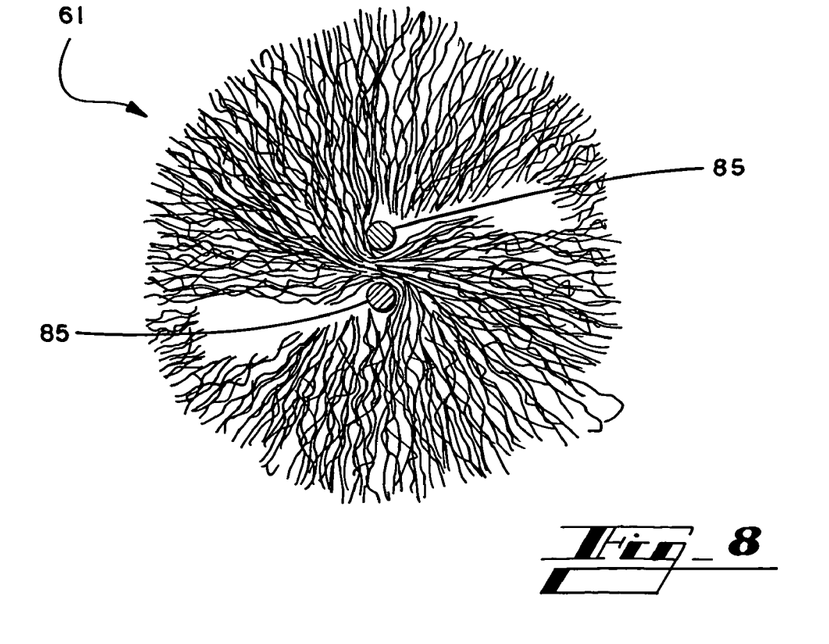
FIG. 8 is a cross-sectional view of a filter media element including a hog ring/binding wire crimping and holding the center of the filter media bundle fibers in an embodiment of the invention.

With continuing reference to FIG. 6, several bundles of elongated fibers 70 are brought together from the spools 75 using a reducing device 80. The device 80 reduces the overall size of the fibers while a hog ring fastener/binding wire 85 or other similar clamp is applied. After the clamps are applied, the fiber bundles are cut at cut lines 90 between each clamp 85 to form a fibrous lump 61 (FIGS. 7 and 8).

In embodiments of the invention, the multi-component fibers can be crimped mechanically and/or by heating.

A mechanical crimping machine is used in one method. Following extrusion, the fibers are mechanically crimped along the length of the fibers to produce crimped fiber. A second method is to produce the multi-component fiber 65 such that the core materials are placed eccentrically from the sheath 65 (FIG. 10). When heat is applied, the fiber materials distort differently resulting in a helically shaped crimp. The amount of heat applied is dependent on the fiber materials.

Referring again to FIG. 2, during initial filling, fluid 22 to be filtered enters from the influent pipe 20 and fills the void 28 between the outer container 15 and flexible housing 25. The air inlet 90 is off. The drain 95 is closed.

Figure 2:
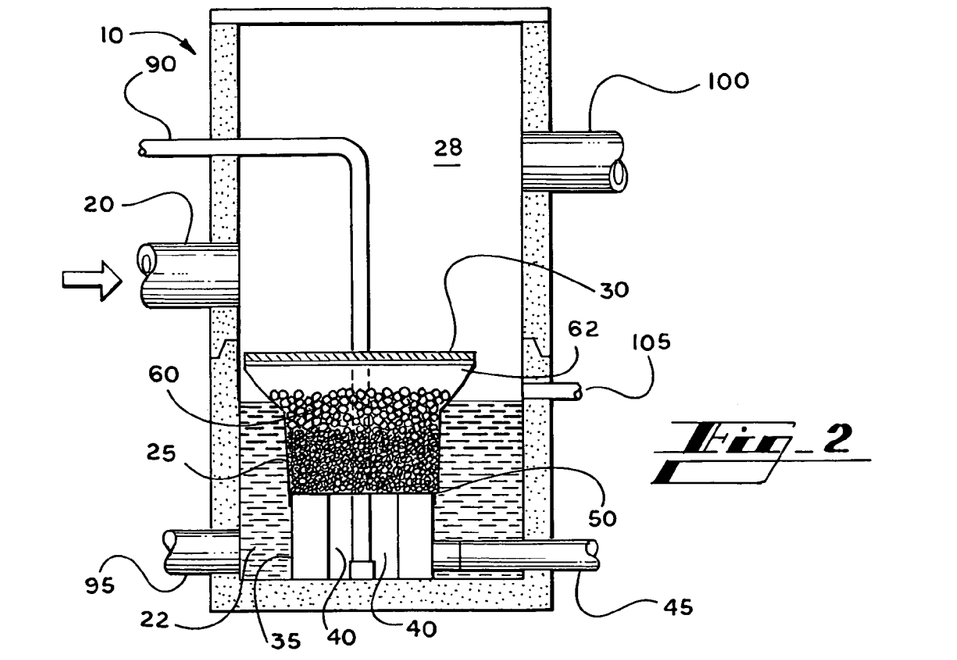
FIG. 2 is a schematic cross-sectional view of a filter apparatus of the present invention during initial filling with fluid to be filtered.

With continuing reference to FIG. 2, initial compression of the filter media is adjustable and can be set by the level of fluid and media inside the filter media housing 25 at the beginning of the filter run. After backwashing (see FIG. 5 and related description), the media is in a relatively uniform suspension with density equal to the number of filter media bundles 61 per volume of fluid within the flexible membrane 25. A lower fluid level inside the flexible membrane 25 will result in a greater density of filter media 60 and thus a greater initial compression when the void space 28 begins to fill and the flexible membrane 25 compresses the filter media 60. A higher fluid level left inside the flexible membrane 25 at the beginning of the filter cycle will result in a lower initial compression. Initial compression is shown in FIG. 2. During this initial filling, it will be appreciated that the flexible housing 25 is relatively expanded until the hydrostatic pressure outside the housing 25 exceeds the pressure within the housing 25.

Figure 3:
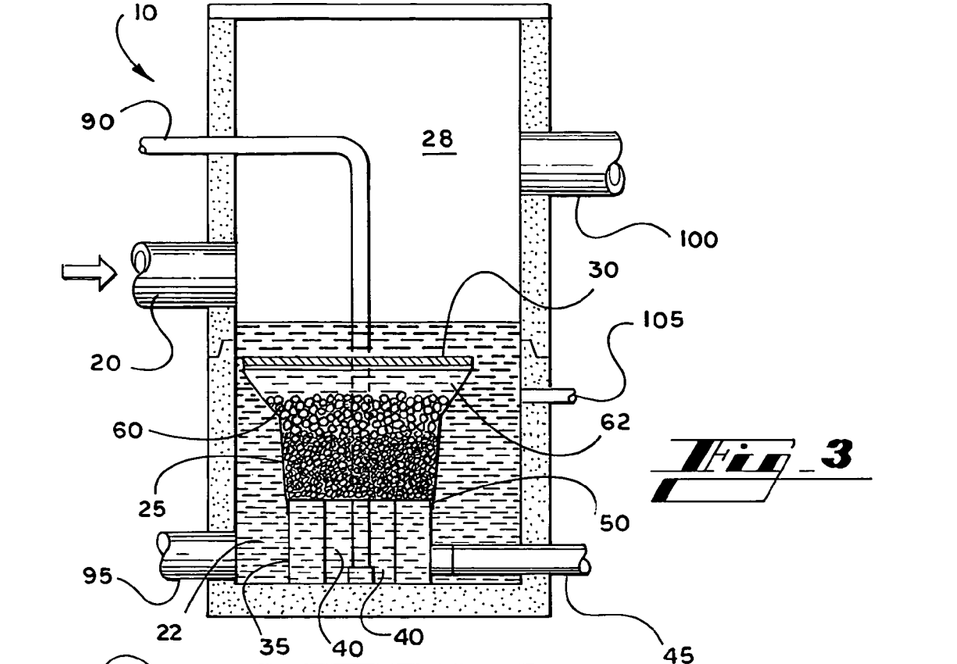
FIG. 3 is a schematic cross-sectional view of a filter apparatus of the present invention as the hydraulic head becomes greater upstream than in the downstream flow and the hydrostatic pressure of the unfiltered fluid compresses the flexible housing in an embodiment of the invention.
Figure 12:
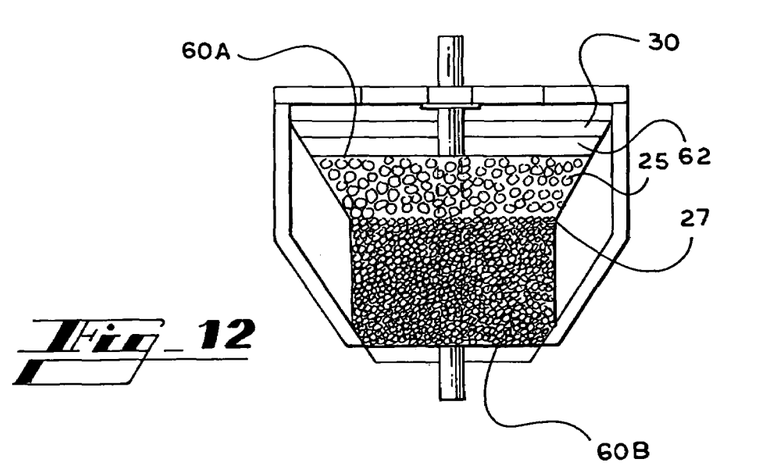
FIG. 12 is a schematic cross-sectional view depicting first and second compression zones of compressible filter media in a filter media housing in an embodiment of the invention.

With further reference to FIGS. 3 and 12, fluid 22 rises above the upper perforated plate 30 of the flexible membrane housing 25, the fluid 22 enters the top perforated plate 30 for filtering by the filter media 60. The fluid being filtered 22 passes downward through the filter media 60 with particulates being removed from the fluid. It will be appreciated that, in general, larger particulates are removed nearer the top of the filter bed with smaller particulates removed deeper in the media bed and as solids begin to bridge the voids between the media fibers a matting takes place resulting in removal of both fine and larger particles in the upper media zone (FIG. 12). It will also be appreciated that less compression with media open to the fluid being filtered 22 results in the upper zone of the media bed and more compression results in the lower zone. Because of the compression zones, the filter bed becomes more effective in removing a larger amount of particulates per unit of media and protect the finer particulates from passing through the filter. The compression differential described above between the upper and bottom zones of the media bed is created in the initial compression developed after backwashing or during initial filter operation.

With continuing reference to FIG. 12, initial compression shows the lower filter media bed 60B to be compressed inward by the filter media housing 25. The upper filter media bed 60A is relatively uncompressed as the housing 25, in embodiments where the housing is a flexible membrane, remains tight and relatively inflexible at the upper portion of the housing 25 between upper plate 30 and a taper point 27.

In other embodiments the filter media housing 25 may include a plurality of components to achieve the similar effect of multiple compression zones. For example, the upper portion of the housing 25 may comprise a rigid element connected to a lower membrane (lower portion of housing 25). The upper filter media 60A in such embodiment would be uncompressed from the external fluid as the rigid upper portion would not flex inward. The flexible lower portion of the filter membrane would be compressible by the outer fluid to generate compressed lower bed 60B.

In still other embodiments, the housing 25 could include a lower housing portion with hinged plate walls instead of a flexible membrane. In such embodiments, the hinged wall could be provided with a hinge near taper point 27, wherein the upper portion of the housing 25 would be a relatively rigid component. Such walls could be provided in a variety of shapes, including flat wall plates with leak-resistant membranes or materials joining one plate to the next plate. Sliding mechanisms may also be used for a portion of the housing to compress inward. It will be appreciated that all such embodiments permit the external fluid pressure to compress the lower portion of the housing and the lower filter media bed 60B inward.

In embodiments where the housing 25 is flexible, it may be constructed of single or multi-ply membranes of chlorosulfonated polyethylene (Hypalon), polyvinyl chloride (PVC), rubber, viton, polypropylene, polyethylene, vinyl, neoprene, polyurethane and woven and non-woven fabrics. In embodiments where rigid materials are used, such as those including an upper rigid portion or including pivotable or sliding housing walls, construction materials could include steel, stainless steel, other metals, reinforced and unreinforced plastics. It will be appreciated, however, that the filter media housing 25 may be constructed of any suitable material depending on the desired filtering use, types of fluids being filtered, desired corrosive characteristics and the like.

It will also be appreciated that although the present invention is shown in embodiments with external fluid pressure generating compressive force against the housing 25 and filter media 60, other external forces may also, or additionally, be used to compress the lower filter media bed 60B. For example, in other embodiments, the side walls of the housing 25 may be actuated in an inwardly pivotable or sliding manner through mechanical, electrical, hydraulic and similar operation. In other embodiments, inflatable components may be provided external to the housing and inflated in a balloon-like manner to press against the housing and compress the filter media.

Referring again to FIG. 12, the top surface of the filter media bed 60 includes space 62 (see also FIGS. 2-4) that is open and untouched by the upper perforated plate. In such embodiment, the upper filter media zone 60A remains uncompressed by not only the housing 25, but also avoids external top to down compression from the upper plate 30 because of spacing 62. It will also be appreciated that the initial compression with relatively uncompressed upper filter media bed 60A with an open surface and the compressed lower filter media bed 60B will result in greater particulate penetration than if the upper filter media bed 60A were compressed or the entire bed were compressed. Finer particulates may therefore be captured in the lower media bed 60B as greater penetration is achieved. It is thus an object of the present invention to maximize fluid filtering efficiency.

Figure 4:
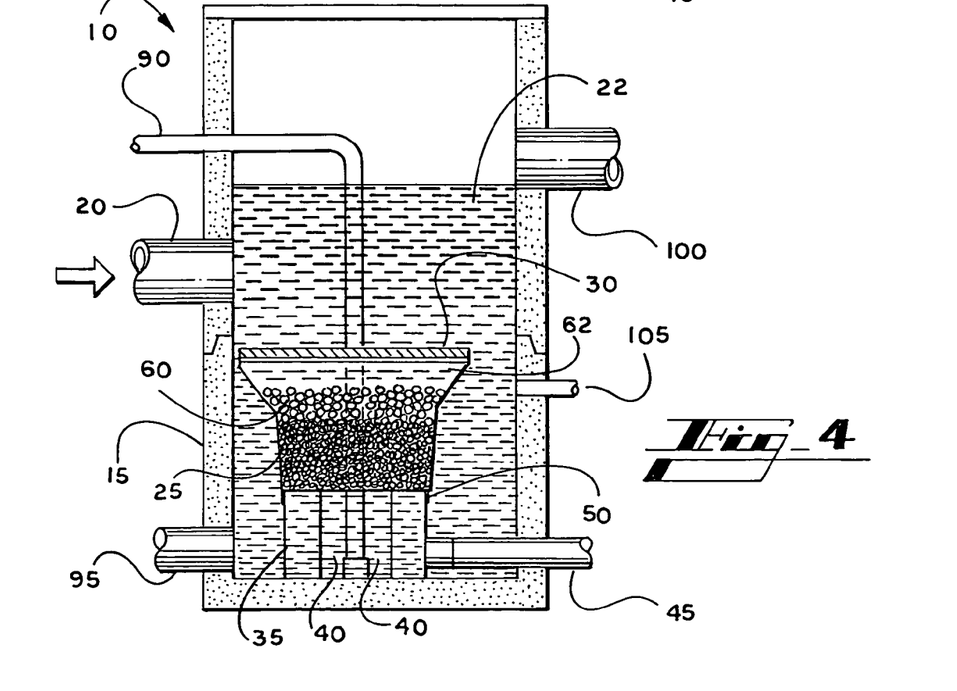
FIG. 4 is a schematic cross-sectional view of a filter apparatus of the present invention as influent level reaches an optional overflow pipe in an embodiment of the invention.

Referring further to FIGS. 3 and 4, as filtration proceeds and more particulates are removed, the hydraulic head differential across the filter becomes greater (FIG. 3 to FIG. 4) causing greater compression in the lower zone 60B to prevent smaller particulates from passing through. There is also a slight upheaval of upper media zone 60A as the lower zone 60B compresses to allow more particulates to enter the filter media 60. Compression of the filter media 60, as described with reference to FIGS. 3 and 4, thus improves filtering as increasingly smaller and more particulate is removed in the filter media bed 60.

In embodiments of the invention, the flexible housing 25 shape is also generally wider at the upper portion than at the lower portion of the housing 25. It will be appreciated that in such embodiments, less filter media 60 is required at the bottom as the filter bed narrows to direct the fluid out of the housing 25 and the fluid 22 being filtered is "cleaner" toward the bottom. Further, the generally tapered embodiment provides additional filter benefits as the media is more loosely packed near the more "open" upper portion and is more densely packed nearer the bottom portion of the housing.

In other embodiments, it will be appreciated that in addition to or instead of tapering housing shapes, different compression levels may be created by higher media concentrations with lower inner fluid levels. Different filter materials and combinations of materials with desired physical properties may also be used to achieve different compression levels, including the layering of filter media with different densities, compressibility or other desired physical and performance characteristics to achieve a desired filter bed that may include one or more zones.

FIG. 3 shows the hydraulic head in the upstream portions outside the flexible housing 25 becoming greater than the downstream hydrostatic pressure. The hydraulic head differential is due to both the flow stream through the filter media 60 and the build-up of particles on the filter media 60, resulting in increasing upstream fluid level as solids are removed (FIGS. 3 and 4). As the hydrostatic pressure outside the filter media housing 25 becomes greater than the hydrostatic pressure inside the housing 25, the housing 25 is further compressed inward, thereby further compressing the filter media 60. In embodiments of the invention, the housing 25 and filter media 60 are compressed in a direction non-parallel, including generally perpendicular in some embodiments (FIGS. 2-4 and 12), to the direction of the fluid flow through the filter media. And as also shown in FIG. 12, and previously described, a plurality of compression zones may be established, such as lower portion of the filter media bed 60B being compressed to remove finer particulates and protect the filter media bed 60 from particle breakthrough.

Referring to FIG. 4, an embodiment of the invention is shown when the filtration cycle has reached its latter stages and/or during a period of peak upstream fluid flow. The latter stage of the filtration cycle is reached when the filter media 60 captures its maximum particle load, and the depth of fluid 22 over the top of the upper perforated plate 30 reaches it maximum fluid level.

In one embodiment of the invention, when the fluid 22 over the filter apparatus 10 reaches it maximum fluid level, closing the influent 20 stops the filter cycle. In this embodiment the backwashing cycle (FIG. 5) is initiated.

In another embodiment of the invention where an overflow pipe 100 is provided, the filter cycle continues whereby fluid 22 is both filtered through the media bed 60 and a portion of the fluid bypasses the filter and is discharged from the outer housing 15 along with the filtered effluent 45. It will be appreciated that filtration of wet weather flows, such as treatment of stormwater or treatment of wet weather discharges from sewer systems, can be designed to remove a specific particle load according to a desired need for a particular event, and after the load is reached or the design flow rate is reached, excess flows and excess particle loads may be discharged from the filter.

FIG. 5 shows the filter media 60 being backwashed to remove particulate build up. During a backwash operation fluid entry from the influent pipe 20 is stopped. Make-up water 23 is introduced into the filter effluent pipe 45 or to an open-close connection valve to the outer section of the housing base portion 35. A backwash outlet, such as a backwash pump discharge 105 connected to a backwash pump 72 (FIG. 14A), can be used to remove the backwashed particles from the containment housing 15 or the backwashed fluid can be removed from the containment 15 by opening a drainpipe 95. During backwash the fluid level within the containment housing 15 is lower than the water level within the filter media housing 25 causing the housing 25 to expand.

In the backwash cycle, an air inlet 90, provides air from a blower at the base portion 35 or under the lower perforated plate 50. It will be appreciated that the backwashed fluid containing the concentrated particulates from the fluid to be filtered 22 is typically transferred to a sanitary sewer system for further treatment, removed by vacuum vehicle equipment for transport to other facilities for further process or by further processing the backwash fluid on-site by other concentrating and dewatering processes.

The air from the air inlet 90 enters the center section of the base 35 and rises through the center of the lower perforated plate 50 and up through the center of the filter media 60. The upward center airflow causes the filter media 60 to circulate within the expanded filter media housing 25 during the washing cycle. Circulation of the filter media 60 causes the media 60 to collide with the upper perforated plate 35 and with other media bundles 60, helping particulates to dislodge. The lower specific gravity of the air/fluid mixture or the hydraulic head of the backwash water within the housing 25 causes the fluid level within the housing 25 to rise and flow over the upper perforated plate 30 into the void 28 inside of the outer container 15 and outside the housing 25. The backwash fluid exits containment 15 by either gravity drainage through drain 95 or pumping through outlet 105.

Figure 13A:
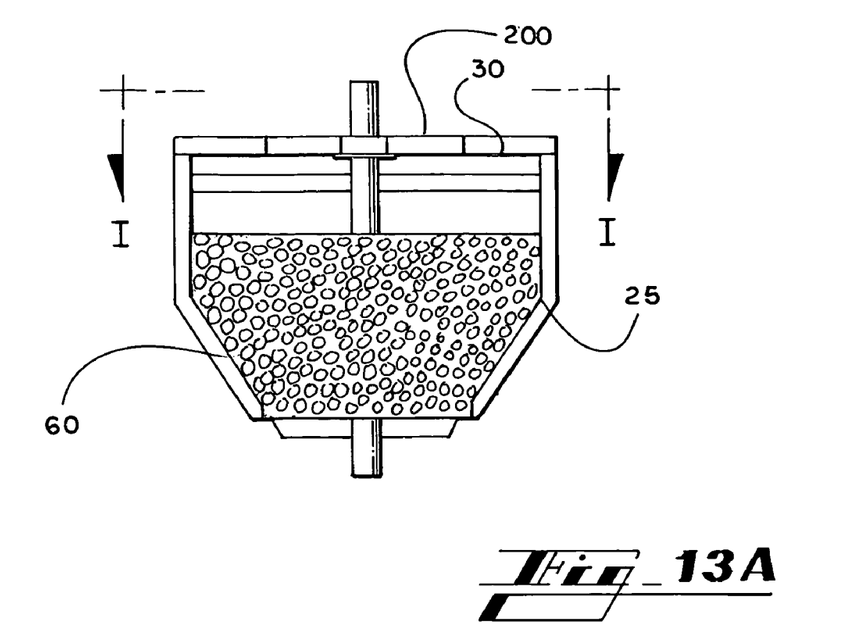
FIG. 13A is a schematic cross-sectional view of a filter media housing including uncompressed filter media and a backwash removal device in an embodiment of the invention.
Figure 13B:
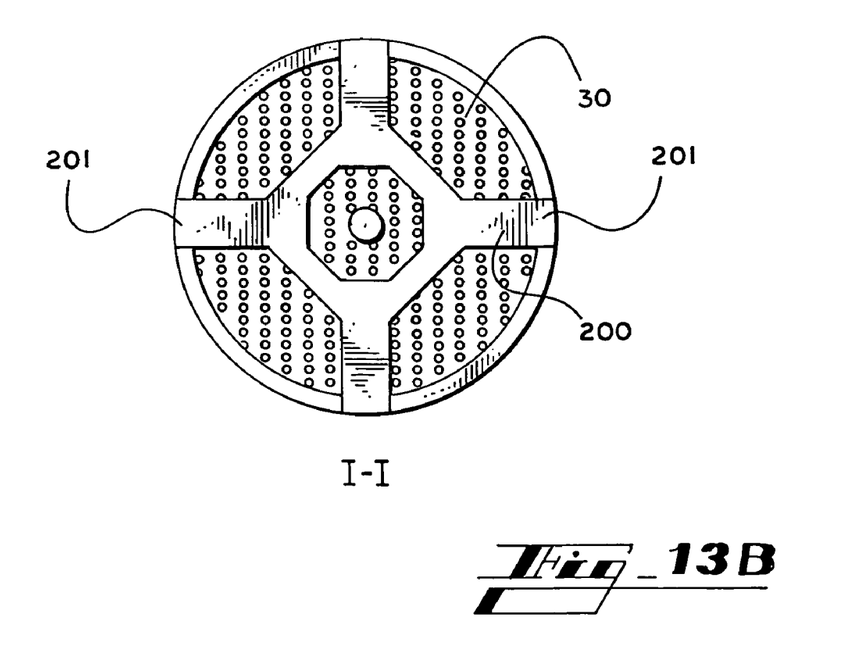
FIG. 13B is a schematic top plan view of a backwash removal device along line I-I of FIG. 13A in an embodiment of the invention.

Another embodiment, shown in FIGS. 13A and 13B, includes backwash removal device 200 having troughs 201, placed on the upper perforated plate 30. In this embodiment, troughs 201 form a donut-shape around the center of the air inlet on the upper perforated plate 30. The troughs 201 receive the backwash fluid with concentrated particulates as the backwash fluid rises above the perforated plate 30 (through the action of centrally directed air) and is directed through the radial troughs 201 to the void 28, thus minimizing particulate recirculation during the backwash mode. It can be appreciated that the quicker the backwash fluid is separated from the circulating media, the less make-up water is required to clean the filter and the shorter the backwashing cycle time. It can also be appreciated that water level in the center of the upper plate 30 is at the highest level caused by the central rising air and this hydraulic head is used to drive the backwash fluid through the radial toughs 201 into the void 28 for removal.

In another embodiment, a drain 95 is provided at the bottom of the outer container 15. The drain 95 can also be opened to remove fluid from inside the outer container 15, such as following backwashing. Further, the void 28 between the outer container 15 and housing 25 can be cleaned, and the drain 95 opened to remove the cleaning fluid. It will be appreciated that a plurality of drains 95 may also be provided.

In another embodiment, the backwash removal device 200 can be designed with troughs 201 being enclosed, for example, using pipes to carry backwash water out of the outer containment 15. It can be appreciated that in certain outer containment structures such as earthen basins with permanent lower water levels or natural water features (such as lakes), the outer containment 15 would not be drained and it may be desired that backwash water be discharged outside of the outer containment 15. It can be further appreciated that in this application the compressible media housing 25 may be actuated inwards or outwards by an inflatable balloon or similar alternative method as described previously. It can be further appreciated that in an application where the outer containment 15 is a natural water feature with a fixed water level, the fluid inlet to the filter may be closed when backwashing occurs.

Accordingly, while the invention has been described with reference to the structures and processes disclosed, it is not confined to the details set forth, but is intended to cover such modifications or changes as may fall within the scope of the following claims.

What is claimed is:

1. A method for removing backwash fluid and solids from a filter apparatus with circulating compressible filter media during backwash comprising:
   directing air in a filter apparatus to circulate an uncompressed bed of compressible filter media and to elevate a localized portion of air-elevated backwash fluid to a highest level above a lower fluid surface level and through a partition near the top of a filter apparatus; and
   directing backwash fluid and solids away from re-entering the partition by receiving air-elevated backwash fluid from the localized portion of backwash fluid in at least one conveyance, comprising a trough, the trough being contiguous to and in contact with the localized portion of the air-elevated backwash fluid for capturing the air-elevated backwash fluid, the trough being adjacent to and positioned above the partition, and the trough being in fluid communications between at least one opening in the partition and with an outlet.

2. The method of claim 1 further comprising conveying backwash fluid away from the at least one opening in the partition.

3. The method of claim 2 wherein the one or more conveyances include at least one trough, and further comprising conveying backwash fluid in the at least one trough.

4. The method of claim 3 further comprising directing airflow through the filter apparatus to circulate loose media and cause backwash fluid to elevate and exit the partition.

5. The method of claim 4 wherein the conveyance includes one or more troughs at least partially surrounding and contiguous to the air-elevated backwash fluid and extending away from the center of the partition and the air-elevated backwash fluid.

6. The method of claim 2 further comprising directing airflow through the filter apparatus to circulate loose media and cause backwash fluid to elevate and exit the partition.

7. The method of claim 3 further comprising one or more troughs extending outward from the at least one opening in the partition and toward a periphery of the filter apparatus.

8. The method of claim 1 wherein the one or more conveyances include at least one trough, and further comprising conveying backwash fluid in the at least one trough.

9. The method of claim 8 further comprising directing airflow through the filter apparatus to circulate loose media and cause backwash fluid to elevate and exit the partition.

10. The method of claim 1 further comprising directing airflow through the filter apparatus to circulate loose media and cause backwash fluid to elevate and exit the partition.

11. The method of claim 10 further comprising circulating one or more bundles of filter media and conveying particulate separated from the filter media and in the elevated backwash fluid away from re-entering the partition.

12. The method of claim 1 further comprising scrubbing particulate out of the filter media and conveying particulate in the elevated backwash fluid away from re-entering the partition.

13. The method of claim 1 further comprising re-supplying backwash fluid with a make-up fluid source.

14. A method for removing backwash fluid and solids from a filter apparatus with circulating compressible filter media during backwash comprising:

circulating an uncompressed bed of individual bundles of loose, compressible filter media in the filter apparatus to remove solids from the filter media;

directing air in the filter apparatus to elevate a localized portion of air-elevated backwash fluid to a highest level above a lower fluid surface level and through a partition retaining the filter media in the filter apparatus; and directing backwash fluid and the solids away from re-entering the partition by receiving air-elevated backwash fluid from the localized portion of backwash fluid in at least one conveyance, comprising a trough, the trough being contiguous to and in contact with the localized portion of the air-elevated backwash fluid for capturing the air-elevated backwash fluid, the trough being adjacent to and positioned above the partition, and the trough being in fluid communications between at least one opening in the partition and with an outlet, wherein the localized portion of the backwash fluid is received by the conveyance within the periphery of the partition.

15. The method of claim 14 further comprising conveying backwash fluid away from the at least one opening in the partition.

16. The method of claim 15 wherein the partition includes a plurality of openings.

17. The method of claim 15 wherein the one or more conveyances include at least one trough, and further comprising conveying backwash fluid in the at least one trough.

18. The method of claim 17 wherein the conveyance includes one or more troughs at least partially surrounding and contiguous to the air-elevated backwash fluid and extending away from the center of the partition and the air-elevated backwash fluid.

19. The method of claim 14 wherein the filter apparatus includes an expandable housing.

20. The method of claim 15 wherein the filter apparatus includes an expandable housing.

* * * * *